US011040777B2

(12) United States Patent
Beckman et al.

(10) Patent No.: US 11,040,777 B2
(45) Date of Patent: Jun. 22, 2021

(54) CLEANOUT SYSTEMS FOR USE WITH AIRCRAFT

(71) Applicant: The Boeing Company, Chicago, IL (US)

(72) Inventors: Mary E. Beckman, West Chester, PA (US); Andrew Leung, Philadelphia, PA (US)

(73) Assignee: THE BOEING COMPANY, Chicago, IL (US)

( * ) Notice: Subject to any disclaimer, the term of this patent is extended or adjusted under 35 U.S.C. 154(b) by 149 days.

(21) Appl. No.: 16/209,526

(22) Filed: Dec. 4, 2018

(65) Prior Publication Data

US 2020/0172252 A1    Jun. 4, 2020

(51) Int. Cl.
| | |
|---|---|
| F28G 1/12 | (2006.01) |
| B64D 13/08 | (2006.01) |
| F28G 1/16 | (2006.01) |
| B08B 5/02 | (2006.01) |
| B64D 13/06 | (2006.01) |
| B60H 1/00 | (2006.01) |
| B08B 9/032 | (2006.01) |

(52) U.S. Cl.
CPC ............ *B64D 13/08* (2013.01); *F28G 1/166* (2013.01); *B08B 5/02* (2013.01); *B08B 9/032* (2013.01); *B08B 2209/032* (2013.01); *B60H 1/00564* (2013.01); *B64D 2013/0618* (2013.01)

(58) Field of Classification Search
CPC . B64D 13/08; B64D 2013/0618; F28G 1/166; B08B 5/02; B08B 9/032; B08B 9/04; B08B 2209/032; B60H 1/00564; B60H 1/00064; B60H 1/00071; B60H 2001/00185; F02C 7/14
USPC ............................................... 165/41, 42, 44
See application file for complete search history.

(56) References Cited

U.S. PATENT DOCUMENTS

| | | | |
|---|---|---|---|
| 4,738,696 A | 4/1988 | Staffeld | |
| 5,405,421 A | 4/1995 | Swisher, Jr. | |
| 2015/0292408 A1* | 10/2015 | Suciu | B01D 46/0023 415/121.2 |
| 2016/0082380 A1 | 3/2016 | Seitz | |
| 2017/0292412 A1* | 10/2017 | Fonseca | B64D 15/04 |
| 2020/0172251 A1 | 6/2020 | Beckman et al. | |

OTHER PUBLICATIONS

United States Patent and Trademark Office, "Non-Final Office Action," issued in connection with U.S. Appl. No. 16/209,488, dated Jan. 22, 2021, 14 pages.

* cited by examiner

*Primary Examiner* — Henry T Crenshaw
*Assistant Examiner* — Kamran Tavakoldavani
(74) *Attorney, Agent, or Firm* — Hanley, Flight & Zimmerman, LLC

(57) ABSTRACT

Cleanout systems are disclosed. An example environmental control system includes an exhaust plenum to exhaust cooling fluid from a heat exchanger outlet of a heat exchanger, and a cleanout system coupled to the exhaust plenum adjacent the heat exchanger outlet. The cleanout system includes a cleanout passageway to fluidly couple a cleanout inlet accessible from an outer surface of the exhaust plenum and a cleanout outlet in fluid communication with the heat exchanger outlet. The cleanout system is to enable removal of particulate from the heat exchanger without disassembling the heat exchanger from the exhaust plenum or an air intake.

20 Claims, 8 Drawing Sheets

CLEANOUT SYSTEMS FOR USE WITH AIRCRAFT

FIELD OF THE DISCLOSURE

This disclosure relates generally to cleanout systems and, more particularly, to cleanout systems for use with aircraft.

BACKGROUND

Aircraft employ heat exchanges to control temperature of air for aircraft cabins and/or other aircraft system(s). Aircraft often employ ram air to cool process air flowing through the heat exchanger. However, ram air can include particulate (e.g., dust, sand, etc.) that can clog the heat exchanger.

SUMMARY

In some examples, an environmental control system includes an exhaust plenum to exhaust cooling fluid from a heat exchanger outlet of a heat exchanger, and a cleanout system coupled to the exhaust plenum adjacent the heat exchanger outlet. The cleanout system includes a cleanout passageway to fluidly couple a cleanout inlet accessible from an outer surface of the exhaust plenum and a cleanout outlet in fluid communication with the heat exchanger outlet. The cleanout system is to enable removal of particulate from the heat exchanger without disassembling the heat exchanger from the exhaust plenum or an air intake.

In some examples, an environmental control system (ECS) includes an air intake, a heat exchanger, and an exhaust plenum. The heat exchanger is positioned between the air intake and the exhaust plenum. The heat exchanger has a heat exchanger inlet in fluid communication with the air intake and a heat exchanger outlet in fluid communication with the exhaust plenum. A cleanout system is carried by the exhaust plenum and positioned adjacent the heat exchanger outlet. The cleanout system has a cleanout passageway between a cleanout inlet and a cleanout outlet.

In some examples, an environmental control system includes means for receiving a cooling fluid and means for transferring heat between the cooling fluid and a process fluid. The means for transferring heat having a first passageway between a first inlet and a first outlet. The first inlet to receive the cooling fluid from the means for receiving the cooling fluid. The ECS includes means for exhausting to exhaust the cooling fluid from the first outlet of the means for transferring heat and means for cleaning particulate from first passageway of the means for transferring heat. The means for cleaning to direct a cleaning fluid from the first outlet, through the first passageway, and to the first inlet.

Figure 1:
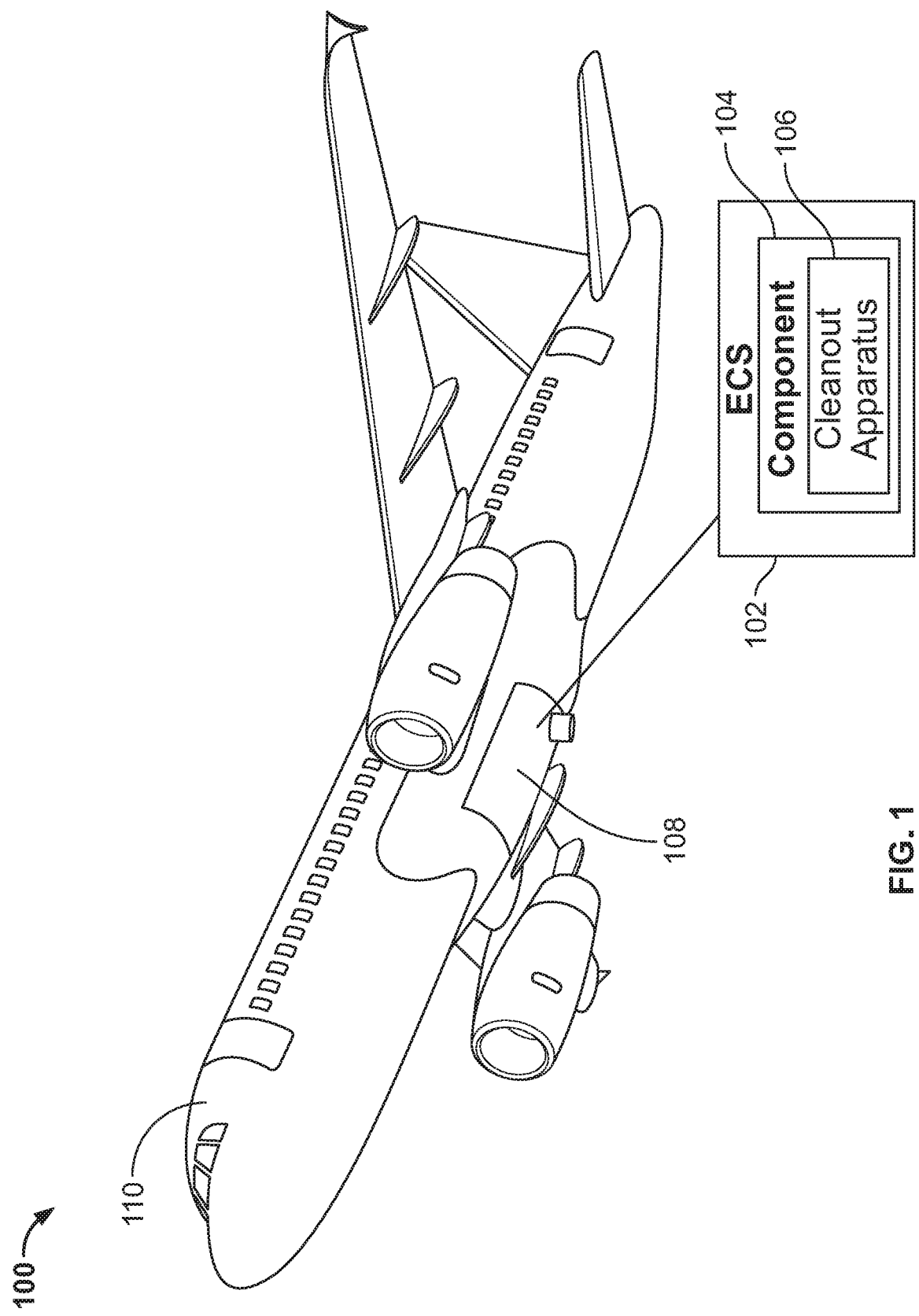
FIG. 1 is an example aircraft including an example cleanout system in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located there between. Stating that any part is in contact with another part means that there is no intermediate part between the two parts. Additionally, several examples have been described throughout this specification. Any features from any example can be included with, a replacement for, or otherwise combined with other features from other examples.

DETAILED DESCRIPTION

Some aircraft operate in harsh conditions (e.g., sandy, dusty or dirty environments) in which particulate (e.g., dust or dirt) collects on aircraft equipment. As the equipment collects particulate or debris, the equipment becomes clogged (i.e., with particulate or debris) causing airflow restriction through the equipment and, thus, reducing equipment efficiency. Aircraft equipment such as, for example, heat exchangers for environmental control systems are prone to contamination and blockage when operating in such harsh conditions.

To prevent or minimize the effects of contamination or blockage of aircraft equipment, aircraft equipment can require frequent maintenance. For example, some aircraft equipment are cleaned after each mission, especially aircraft employed in harsh conditions (e.g., sandy areas). To remove particulate from aircraft equipment, such as heat exchangers, current maintenance procedures require that the heat exchangers be removed for cleaning. However, complexity of the environmental control systems (hereinafter ECSs) makes it difficult to remove the heat exchangers separately, which can be time consuming and increases maintenance costs. In some cases, unique ground services equipment or tools have been developed for on-aircraft cleaning. However, the ground service equipment may not be readily available. In some instances, the specialized design of the ECS (e.g., ram air ducting) makes access to equipment (e.g., heat exchangers) difficult for cleaning. Thus, the ground service equipment has limited cleaning effectiveness due to complex design of ECS exit/plenum ducting. For example, some known ground service equipment have to be custom designed due to the limited access caused by the inner plenum ducting. These ground service equipment have limited effectiveness as well.

Example cleanout systems disclosed herein simplify aircraft equipment cleaning and maintenance (e.g., reduce maintenance time) for aircraft equipment that draw atmospheric air. Example cleanout systems disclosed herein allow aircraft equipment to be cleaned and maintained more efficiently while remaining attached to an aircraft during a cleaning process. For example, example cleanout systems disclosed herein facilitate aircraft equipment cleaning without the need to disassemble the equipment from the aircraft.

Example cleanout systems disclosed herein simplify cleaning and reduce maintenance time needed to service a heat exchanger that receives ram air. Example cleanout systems disclosed herein incorporate built-in tubing that allows for connection of a compressed air or pressurized water hose (cleaning fluid). The tubing includes nozzles or sweeping jet fluidic actuators to efficiently direct the cleaning fluid onto the back face (downstream side) of the heat exchanger to remove particulate (e.g., dust, dirt, sand, etc.). In some examples, cleanout system disclosed herein can be employed with aircraft, heating, ventilation and air conditioning (HVAC) systems, construction equipment and/or vehicle(s), and/or any other vehicle.

FIG. 1 illustrates an example aircraft 100 that includes an ECS 102 having a component 104 (e.g., a heat exchanger) implemented with an example cleanout system 106 in accordance with teachings of this disclosure. The ECS 102 provides air supply, thermal control and/or cabin air or pressurization. To perform maintenance on the component 104, the cleanout system 106 can be accessible via an access panel 108 of a fuselage 110 of the aircraft 100. The component 104 can be a heat exchanger (e.g., a primary heat exchanger, a secondary heat exchanger, a pre-cooler, an inlet or air intake, and/or any other component of the aircraft 100. The aircraft 100 is a commercial aircraft. However, the teachings disclosed herein are not limited to the aircraft 100 of FIG. 1. For example, the cleanout system disclosed herein can be implemented with other types of aircraft such as, for example, vertical takeoff and landing aircraft, military aircraft, helicopters, drones, and/or any other type of aircraft. In some examples, the cleanout system disclosed herein can be implemented with other types of vehicles including, but not limited to, a ship, a submarine, a ground vehicle (e.g., a race car, a train, an automobile, a bus, construction vehicles and/or equipment, etc.) and/or any other vehicle(s). In some examples, the cleanout system disclosed herein can be employed with air ventilation systems of buildings (e.g., heating, ventilation, and air conditioning (HVAC) systems), vehicles (e.g., cabin air), and/or any other ventilation system(s). In some examples, the cleanout system 106 disclosed herein can be retrofitted to aircraft or vehicle(s).

Figure 2:
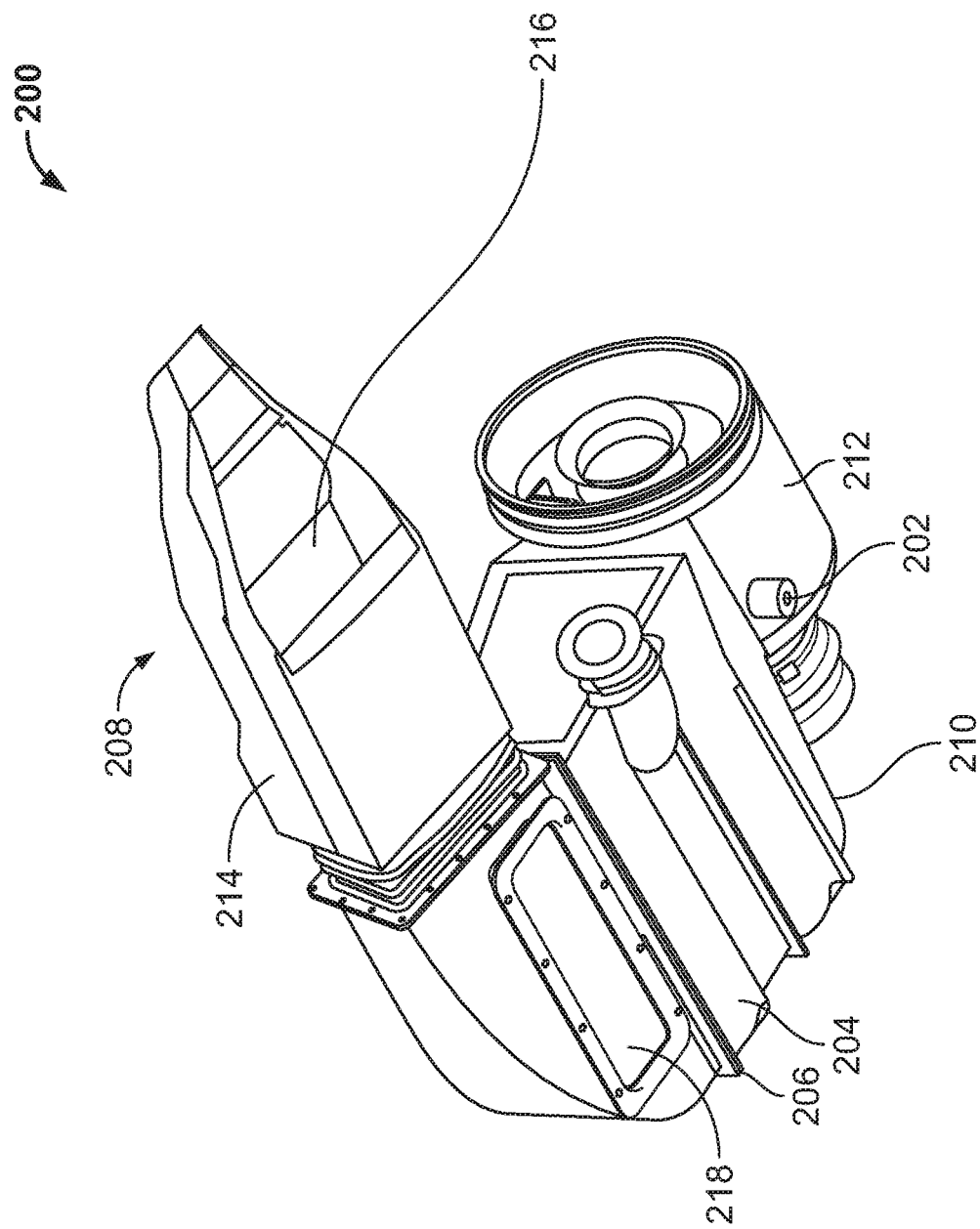
FIG. 2 is a perspective view of an example air cycle cooling system implemented with an example cleanout system disclosed herein.

FIG. 2 is a perspective view of an air cycle cooling system 200 of the ECS 102 of FIG. 1. The air cycle cooling system 200 includes a cleanout system 202 constructed in accordance with teachings of this disclosure.

Referring to FIG. 2, the air cycle cooling system 200 includes a heat exchanger 204 (e.g., a primary heat exchanger, a ram air heat exchanger, etc.) having a first side 206 in fluid communication with an air intake 208 (e.g., a ram air intake) and a second side 210 opposite the first side 206 in fluid communication with an exhaust plenum 212 (e.g., a cooling air exhaust plenum). The air intake 208 includes a duct 214 that provides ram air from an inlet 216 to the heat exchanger 204. Specifically, the inlet 216 is in fluid communication with a scoop or opening formed on the fuselage 110 and receives atmospheric air (ram air). Additionally, the air intake 208 (e.g., the duct) includes a panel 218 to enable access to (e.g., the first side of) the heat exchanger 204. The heat exchanger 204 is positioned between the air intake 208 and the exhaust plenum 212. Specifically, the air intake 208 of the illustrated example is directly attached to the first side 206 of the heat exchanger 204 and the exhaust plenum 212 is directly attached to the second side 210 of the heat exchanger 204.

Figure 3A:
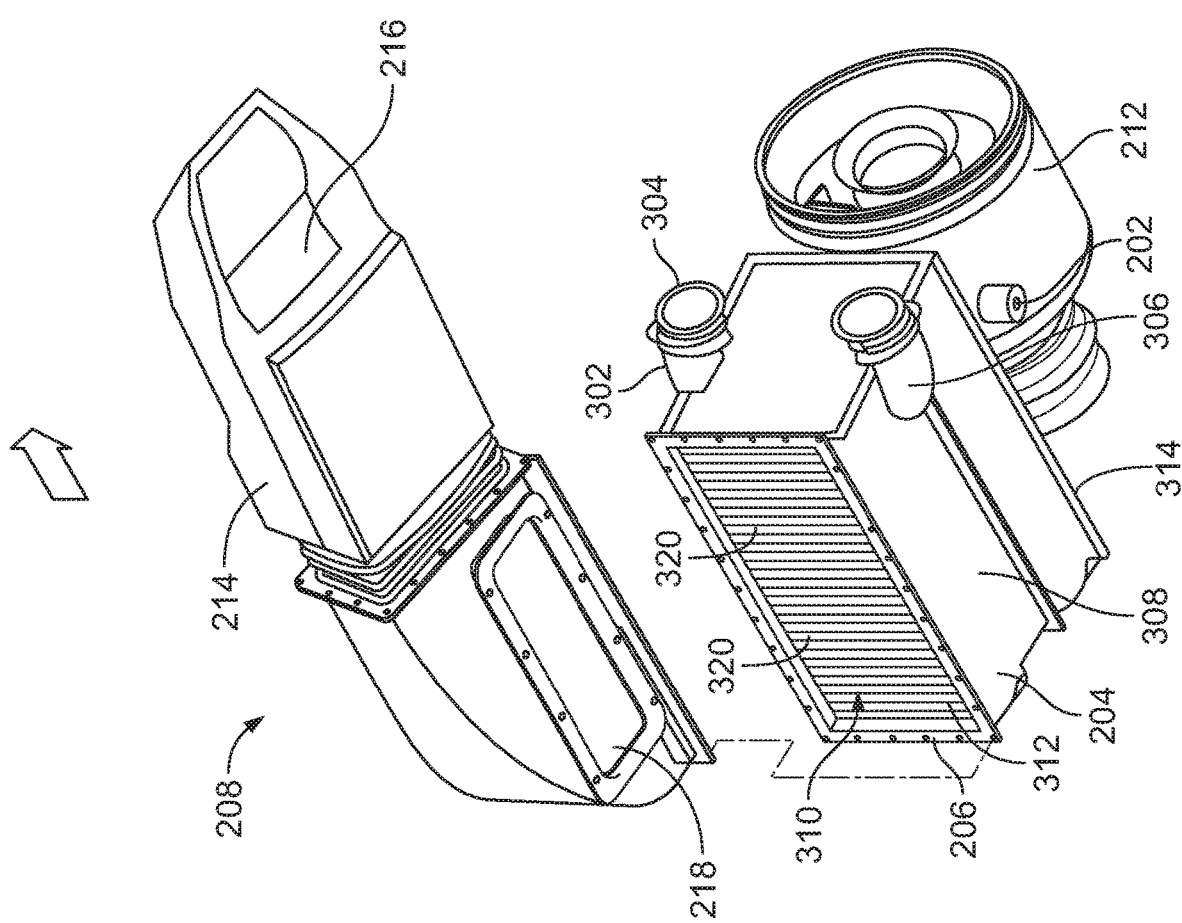
FIG. 3A is perspective, partially exploded view of the example air cycle cooling system of FIG. 2.
Figure 3B:
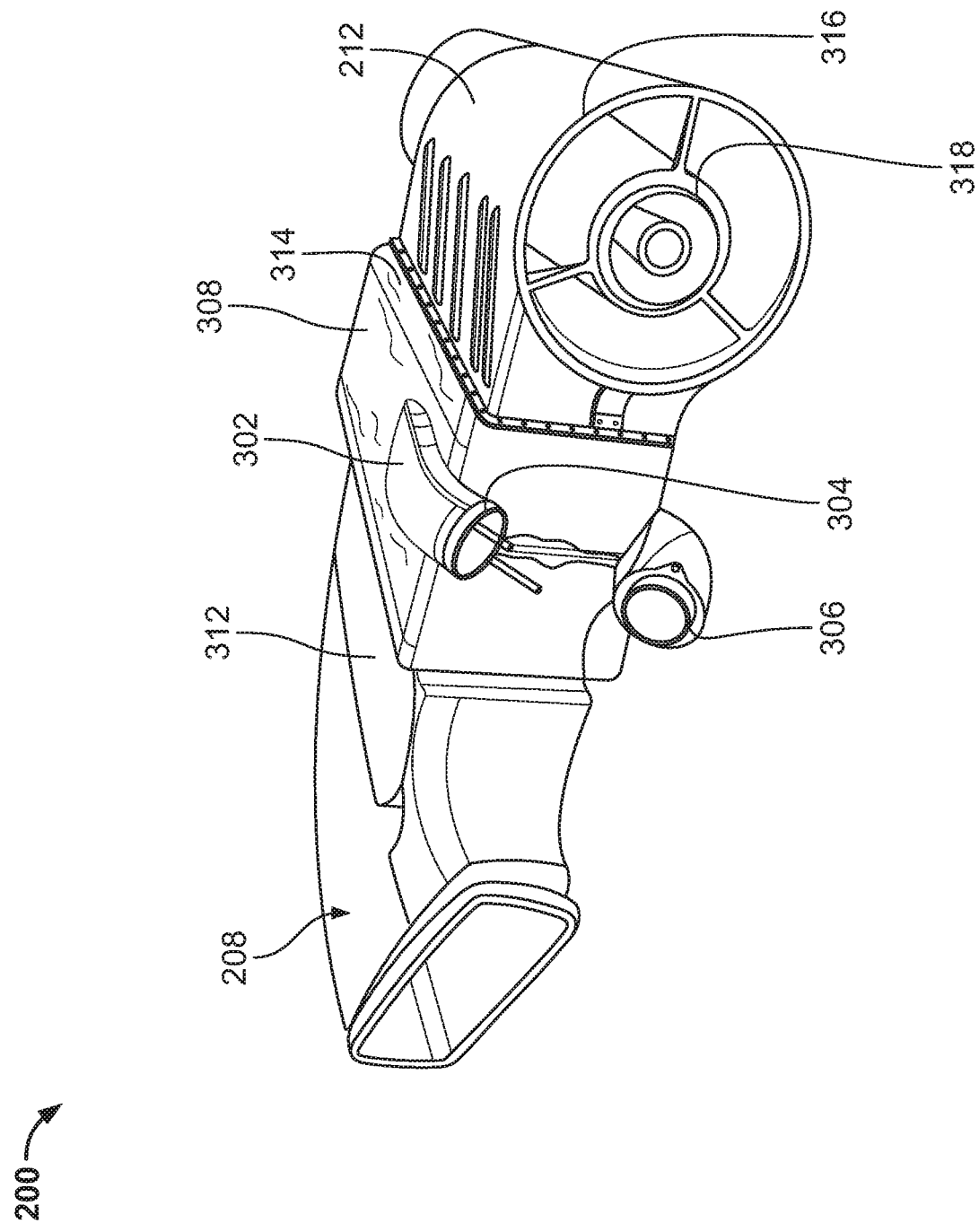
FIG. 3B is partial, perspective view of the example air cycle cooling system of FIGS. 2 and 3B.

FIG. 3A is a partially exploded view of the air cycle cooling system 200 of FIG. 2. FIG. 3B is a perspective view of the heat exchanger 204 and the exhaust plenum 212. The heat exchanger 204 has a first passageway 302 that includes a first inlet 304 and a first outlet 306. The first passageway 302 passes through a body 308 (e.g., positioned within a frame defined by the body 308) of the heat exchanger 204 and receives heated air (e.g., from an engine bleed air system, a cycle machine, etc.) via the first inlet 304 and provides cooled air (e.g., to a reheater inlet 312, an air cycle machine, etc.) via the first outlet 306. To cool the air (e.g., engine bleed air) flowing through the first passageway 302, the heat exchanger 204 includes a second passageway 310 having a second inlet 312 (e.g., a heat exchanger inlet) and a second outlet 314 (e.g., a heat exchanger outlet). The first passageway 302 is fluidly isolated from the second passageway 310.

The second passageway 310 of the heat exchanger 204 receives ram air via the air intake 208. As the ram air flows through the second passageway 310 (e.g., between the second inlet 312 at the first side 206 of the heat exchanger 204 and the second outlet 314 at the second side 210 of the heat exchanger 204), the ram air cools the fluid flowing through the first passageway 302. The second outlet 314 is fluidly coupled to the exhaust plenum 212. Thus, the ram air exits the second passageway 310 into the exhaust plenum 212. To provide alternate exhaust flow paths depending on flight conditions, the exhaust plenum 212 includes a first exhaust plenum 316 (e.g., an outer duct) and a second exhaust plenum 318 (e.g., an inner duct). For example, during ground or low speed flight, ram air at the second outlet 314 is drawn into the second exhaust plenum 318 by an air cycle machine or ram air fan. During high altitude flight, air at the second outlet 314 bypasses the fan and flows through the first exhaust plenum 316. The first exhaust plenum 316 is concentric relative to the second exhaust plenum 318. However, in other examples, the first exhaust plenum 316 is offset relative to the second exhaust plenum 318.

In harsh conditions, the air intake 208 receives air with particulate (e.g., airborne debris, sand, dirt, etc.). When operating in harsh conditions, the particulate becomes trapped in the second passageway 310 of the heat exchanger 204. Specifically, the particulate becomes trapped on one or more fins 320 located in the second passageway 310 (e.g., within the body 308 of the heat exchanger 204). In some instances, the particulate clogs (e.g., reduces an affective airflow opening of) the second inlet 312 and can significantly reduce airflow through the second passageway 310, thereby reducing the efficiency of the heat exchanger 204. To clean particulate trapped in the second passageway 310, the air cycle cooling system 200 of the illustrated example includes the cleanout system 202. The cleanout system 202 of the illustrated example can clean the particulate from the second passageway 310 without removing or disassembling the air cycle cooling system 200.

Figure 4A:
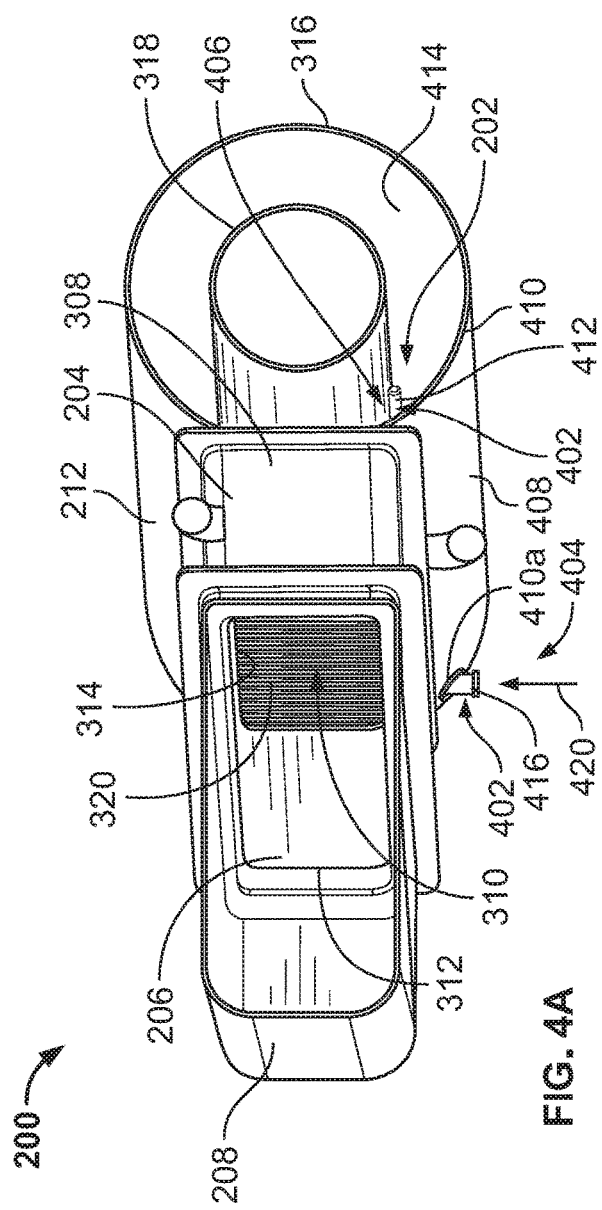
FIGS. 4A and 4B are a perspective views of the air cycle cooling system of FIGS. 2, 3A, and 3B.
Figure 4B:
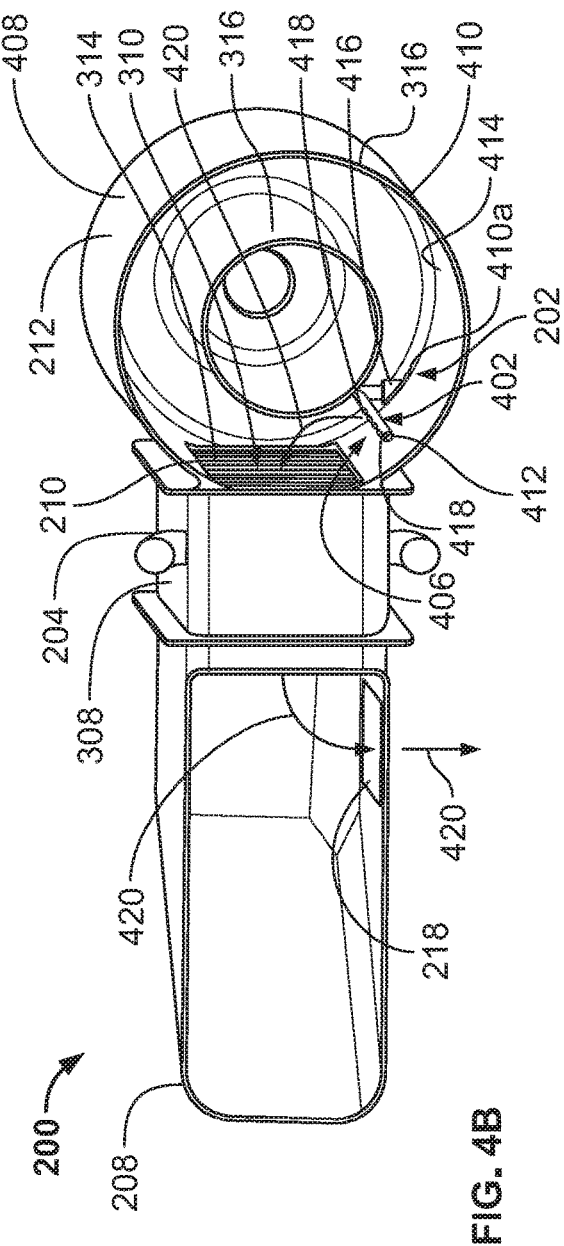

FIGS. 4A and 4B are simplified perspective views of the air cycle cooling system 200 of FIGS. 2, 3A and 3B. Specifically, FIGS. 4A and 4B are perspective views of the air intake 208, the heat exchanger 204 and the exhaust plenum 212. The first passageway 302 is not shown in FIGS. 4A and 4B for clarity. Also, the fins 320 extend through the second passageway 310 between the second inlet 312 and the second outlet 314 as shown in FIGS. 4A and 4B. Referring to FIGS. 4A and 4B, the cleanout system 202 of the illustrated example includes a cleanout passageway 402 defining a cleanout inlet 404 and a cleanout outlet 406. The cleanout inlet 404 of the illustrated example is accessible from an outer surface 408 or an exterior of the exhaust plenum 212. For example, the cleanout inlet 404 is adjacent a wall 410 of the exhaust plenum 212. The cleanout outlet 406 is in fluid communication with the second passageway 310 of the heat exchanger 204. Specifically, the cleanout outlet 406 is positioned inside the exhaust plenum 212 and the second outlet 314 of the second passageway 310. Specifically, the cleanout passageway 402 extends across at least a portion of the second outlet 312 of the heat exchanger 204.

The cleanout passageway 402 (e.g., the cleanout system 202) of the illustrated example is carried or supported by the exhaust plenum 212. For example, the cleanout system 202 and/or the cleanout passageway 402 is fixed to the exhaust plenum 212 and remains attached to the exhaust plenum 212 during normal operation of the heat exchanger 204. The cleanout system 202 and/or the cleanout passageway 402 does not interfere with an operation of the heat exchanger 204 and/or the ECS 102.

The cleanout passageway 402 of the illustrated example includes a pipe 412 (e.g., a duct, a hose, a PVC pipe, an aluminum duct, tubing, etc.). The cleanout passageway 402 (e.g., an entire length of the pipe 412 between the cleanout inlet 404 and cleanout outlet 406) is positioned inside a cavity 414 of the first exhaust plenum 316 (e.g., does not extend outside of the exhaust plenum 212). Thus, the cleanout inlet 404 is located at an exterior of the exhaust plenum 212 and the cleanout outlet 406 is located inside the cavity 414 of the exhaust plenum 212. Thus, the cleanout passageway 402 is positioned between the first exhaust plenum 316 and the second exhaust plenum 318. In some examples, the cleanout passageway 402 of the illustrated example includes a first portion positioned inside the cavity 414 and a second portion extending outside of the exhaust plenum 212. In some such examples, the cleanout inlet 404 can be provided by the second portion of the cleanout passageway 402 located outside of the exhaust plenum 212.

The cleanout inlet 404 of the illustrated example includes a cleanout fitting 416. The cleanout fitting 416 of the illustrated example can be a quick-connect hose fitting, a threaded fitting and/or any other fitting to receive cleaning fluid from a supply source (e.g., a hose). The cleanout inlet 404 and/or the cleanout fitting 416 passes through an opening 410a of the wall 410 of the exhaust plenum 212. In some examples, the cleanout inlet 404 can include a seal to prevent leakage through the opening of the wall 410.

The cleanout outlet 406 of the illustrated example includes one or more openings 418. The openings 418 of the illustrated example are formed along a length of the cleanout passageway 402 (e.g., the pipe 412). The openings 418 are oriented toward the second side 210 or the second outlet 314 of the second passageway 310. The cleanout system 202 of the illustrated example can include one opening 418 or any number of openings 418 (e.g., 5 openings) to implement the cleanout system 202. Thus, the cleanout passageway 402 provides a directional duct that directs cleaning fluid toward the second outlet 314 of the heat exchanger 204.

To clean the second passageway 310, the cleanout fitting 416 receives a cleaning fluid 420 from a supply source (e.g., a hose or tubing). In a cleanout operation, the cleanout system 202 enables removal of particulate (e.g., debris, sand, dirt, etc.) from the heat exchanger 204 without disassembling the heat exchanger 204 and/or removal of the air intake 208. To clean the heat exchanger 204, the cleaning fluid 420 is provided (e.g., injected) into the cleanout passageway 402 via the cleanout inlet 404. To receive the cleaning fluid 420, a supply source (e.g., a hose) supplying the cleaning fluid 420 couples to the cleanout inlet 404 (e.g., the cleanout fitting 416). The cleaning fluid 420 can be pressurized air, pressurized water, a cleaning agent, a combination thereof, and/or any other fluid(s).

When the cleaning fluid 420 is provided to the cleanout passageway 402, the cleaning fluid 420 flows from the cleanout inlet 404 to the cleanout outlet 406. Specifically, the cleaning fluid 420 is directed toward the second side 210 of the heat exchanger 204 via the cleanout outlet 406 (e.g., at a relatively high pressure). Thus, the cleaning fluid 420 exits the openings 418 at a relatively high velocity. A number of the openings 418 can vary (e.g., increase or decrease) depending on a size of the heat exchanger 204.

The cleaning fluid 420 flows from the second side 210 or the second outlet 314 of the heat exchanger 204, through the second passageway 310 of the heat exchanger 204 and exits from the first side 206 or the second inlet 312 of the heat exchanger 204. Thus, the cleaning fluid 420 flows through the heat exchanger 204 in a direction (e.g., from the second side 210 to the first side 206) that is opposite to a direction of the ram air when the heat exchanger is in operation. In other words, the cleanout system 202 allows cleaning from a downstream side of the heat exchanger 204 to an upstream side of the heat exchanger 204. As the cleaning fluid 420 passes through the second passageway 310 from the second outlet 314 to the second inlet 312 and exits the second side 210 of the heat exchanger 204, the cleaning fluid 420 removes the particulate from the second passageway 310. For example, the cleaning fluid 420 removes particulate from the fins 320 positioned in the body 308 of the heat exchanger 204. The cleaning fluid 420 and particulate exits the first side 206 and through the panel 218 (e.g., and into the atmosphere).

As a result, the cleaning fluid 420 unclogs the second passageway 310. Because the cleanout system 202 is accessible from an exterior of the air cycle cooling system and/or the heat exchanger, the cleanout system 202 cleans the heat exchanger 204 without having to disassemble the heat exchanger 204 and/or the air intake 208. In other words, the cleanout system 202 removes particulate from the second passageway 310 of the heat exchanger 204 located between the second inlet 312 and the second outlet 314 while the air intake 208 and the exhaust plenum 212 remain attached to the heat exchanger 204. Additionally, the cleanout system of the illustrated example does not require specialized ground equipment tools and/or does not require the tools to maneuver around the first exhaust plenum 316 and/or the second exhaust plenum 318 to reach the second outlet 314 of the second passageway 310.

Figure 5:
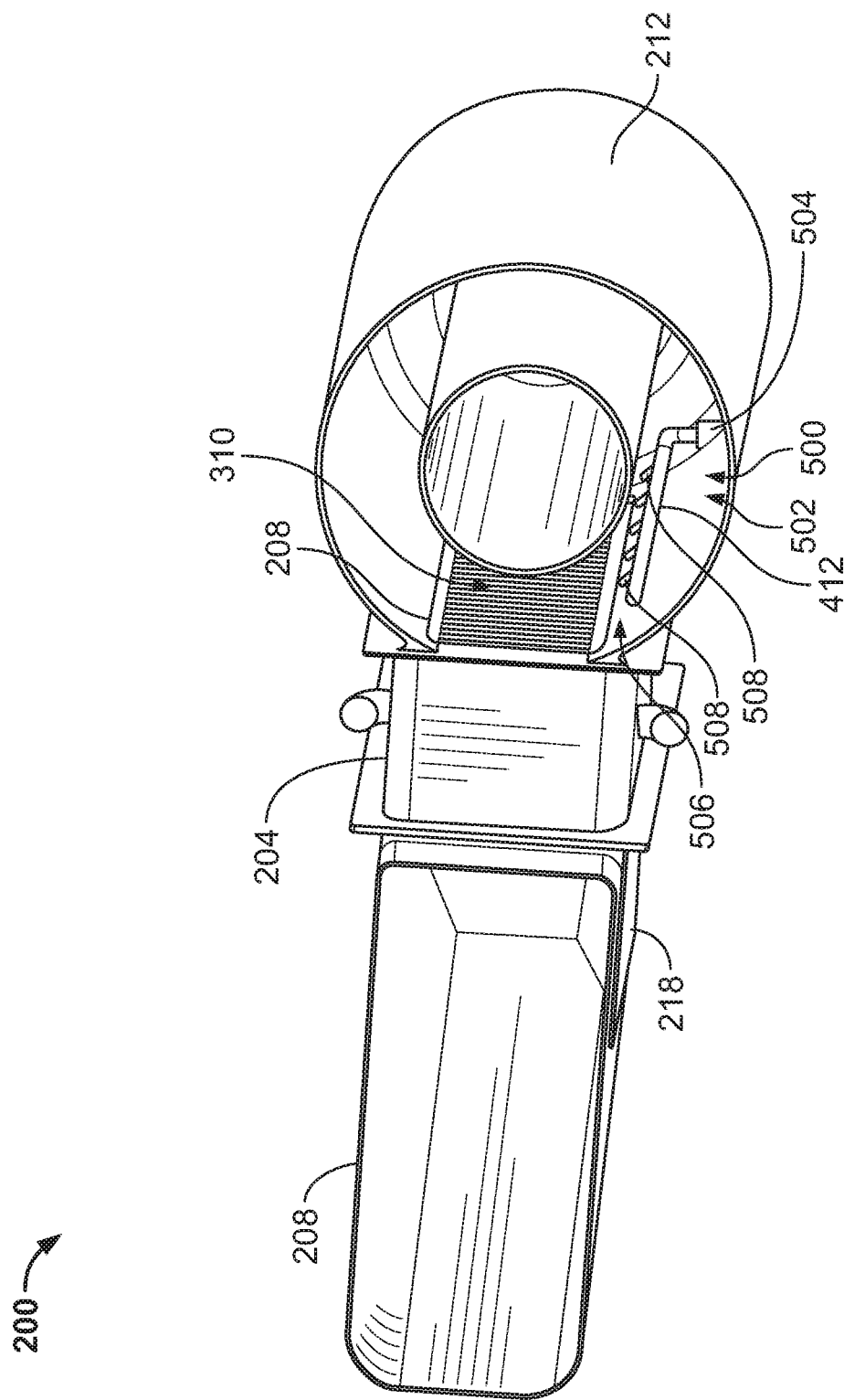
FIG. 5 is a perspective view of another example cleanout system disclosed herein.
Figure 6A:
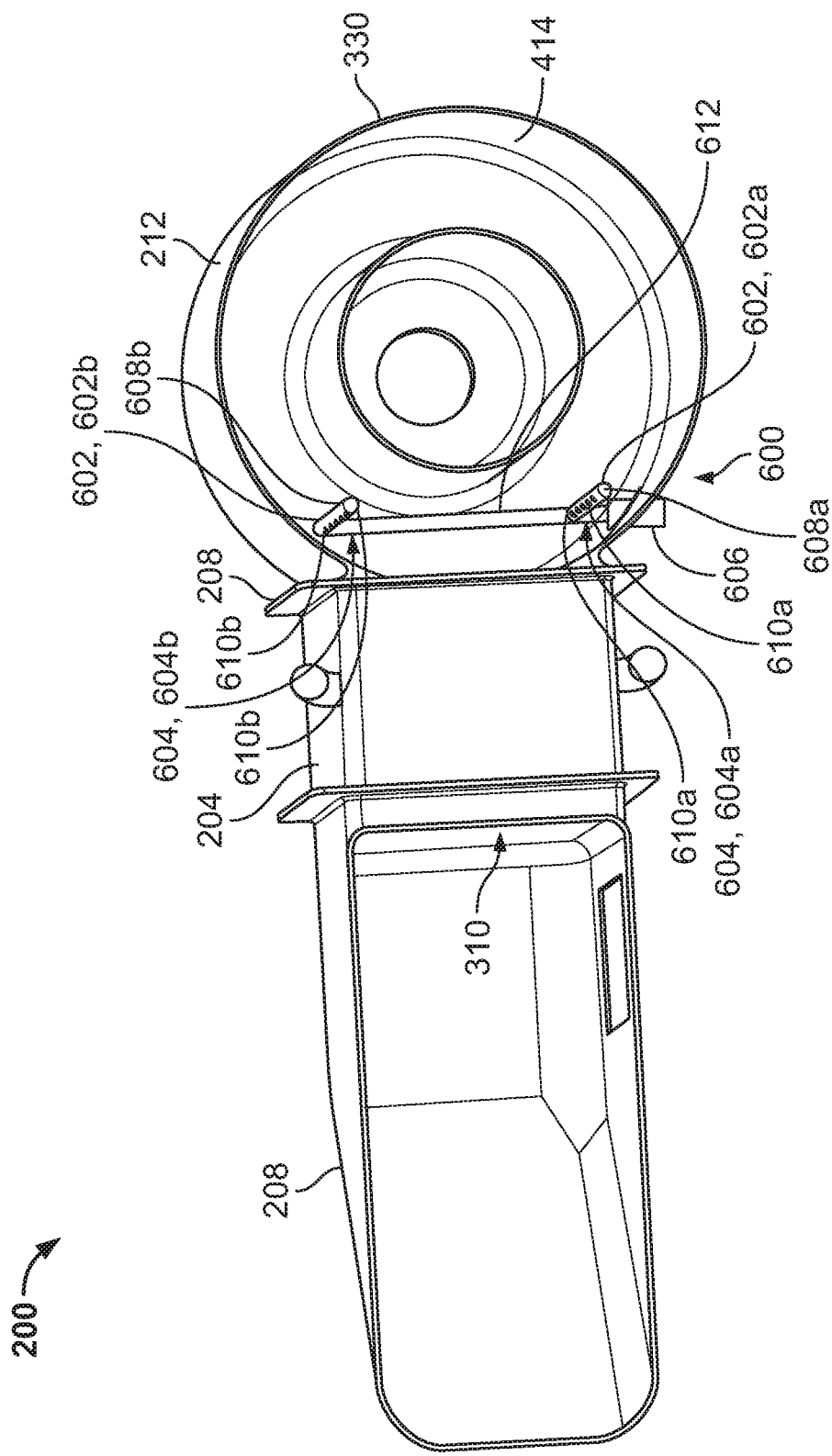
FIGS. 6A and 6B are perspective views of another example cleanout system disclosed herein.
Figure 6B:
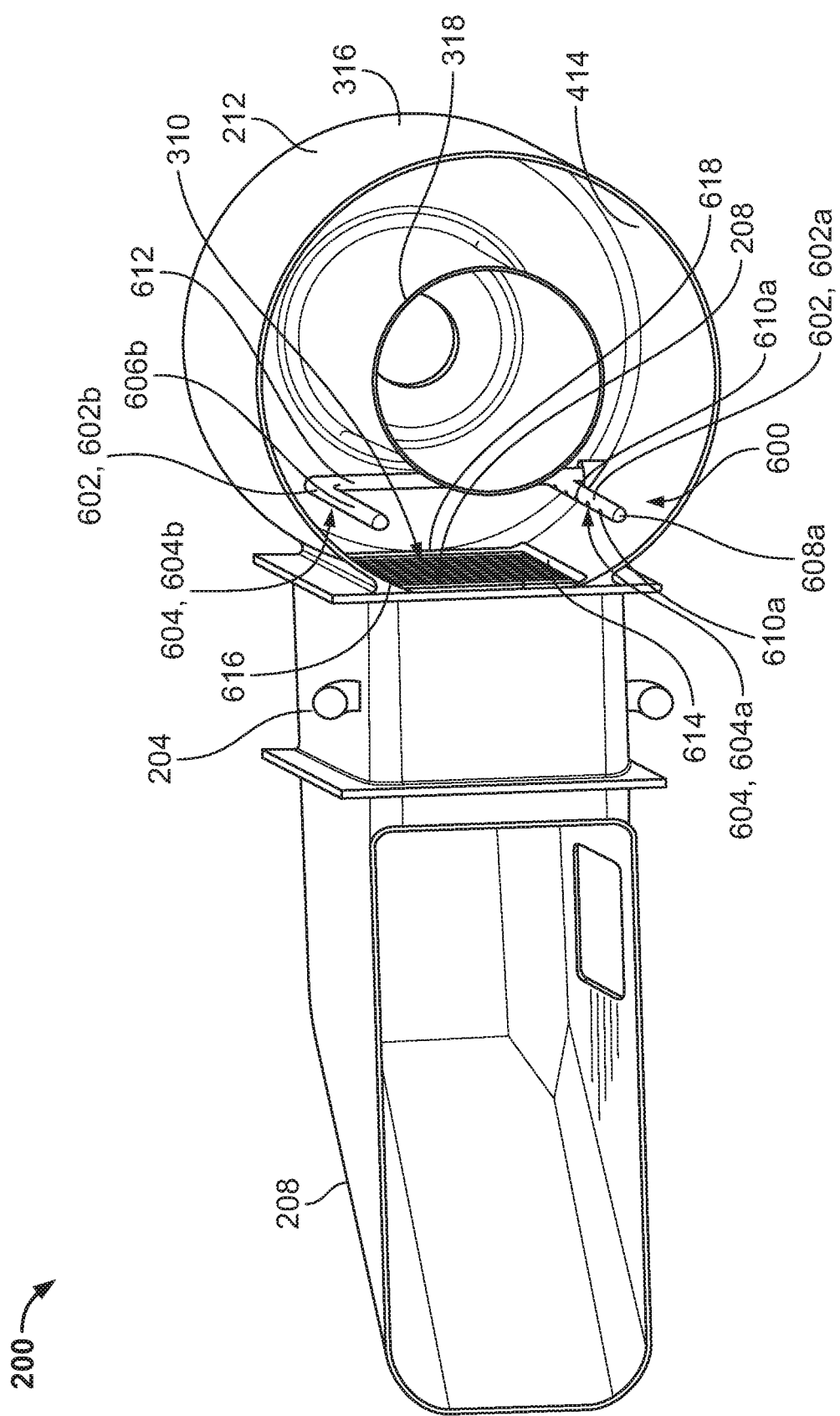

FIGS. 5, and 6A and 6B illustrate other example cleanout systems 500 and 600 disclosed herein. Those components of the example cleanout systems 500 and 600 of FIGS. 5, 6A and 6B that are substantially similar or identical to the components of the cleanout system 202 described above and that have functions substantially similar or identical to the functions of those components will not be described in detail again below. Instead, the interested reader is referred to the above corresponding descriptions. To facilitate this process, identical reference numbers will be used for like structures.

FIG. 5 is a perspective view of another example cleanout system 500 disclosed herein. The cleanout system 500 of the illustrated example includes a cleanout passageway 502 having a cleanout inlet 504 and a cleanout outlet 506. The cleanout system 500 is similar to the cleanout system 202 of FIGS. 1, 2A, 2B, 3, 4A and 4B, except the cleanout outlet 506 includes a plurality of nozzles 508. In some examples, the nozzles 508 are integrally formed with a pipe 412 of the cleanout system 500. In some examples, the nozzles 508 can be coupled (e.g., threadably coupled) to openings (e.g., the openings 418 of FIGS. 4A and 4B) formed in the pipe 412. The nozzles 508 are spaced along a length of the pipe 412 and direct the cleaning fluid 420 toward a second side 210 of the heat exchanger 204. The nozzles 508 are adjustable to adjust (e.g., increase or decrease) a characteristic (e.g., a pressure, a velocity, a spray pattern, etc.) of the cleaning fluid 420 exiting the nozzles 508 toward the second side 210 of the heat exchanger 204. The cleanout system 500 of the illustrated example includes five nozzles 508. However, any number of nozzles 508 (e.g., less than five, greater than five) can be used to implement the cleanout system 500 of FIG. 5.

In some examples, the cleanout system 500 can include one or more directional vanes or fluidic actuators (e.g., sweeping jet actuators) instead of, or in addition to, the nozzles 508. The actuators enhance cleaning by directing the cleaning fluid 420 at a much wider angle or surface area than the nozzles 508 of the cleanout system 500 of FIG. 5. A single sweeping jet actuator or an array of actuators can be configured to cover an entire surface area of a second side 210 of the heat exchanger 204. Each of the sweeping jet actuators provides a sweeping fluid pattern that covers an (e.g., entire) width of the second side 210 of the heat exchanger 204.

FIGS. 6A and 6B are perspective views of another example cleanout system 600 disclosed herein that can implement the air cycle cooling system 200. The cleanout system 600 of the illustrated example includes a plurality of cleanout passageways 602 and a plurality of cleanout outlets 604 to provide cleaning fluid to the second side 210 of the heat exchanger 204. For example, the cleanout system 600 of the illustrated example includes a first cleanout passageway 602a to fluidly couple a cleanout inlet 606 and a first cleanout outlet 604a, and a second cleanout passageway 602b to fluidly couple the cleanout inlet 606 and a second cleanout outlet 604b. The first cleanout outlet 604a is spaced from the second cleanout outlet 604b.

The first cleanout passageway 602a include a first pipe 608a (e.g., a horizontal pipe) and a plurality of openings 610a directed toward the second side 210 of the heat exchanger 204. The second cleanout passageway 602b include a second pipe 608b (e.g., a horizontal pipe) and a plurality of openings 610b directed toward the second side 210 of the heat exchanger 204. An intermediate pipe 612 (e.g. a vertical pipe) fluidly couples the cleanout inlet 606 and the second pipe 608. The intermediate pipe 612 of the illustrated example does not include a cleanout outlet (e.g., one or more openings 610a, 610b). However, in some examples, the intermediate pipe 612 can include a cleanout outlet (e.g., one or more openings 610a, 610b). The first pipe 608a is adjacent a first edge 614 (e.g., a lower edge) of the heat exchanger 204 and the second pipe 608b is adjacent a second edge 616 (e.g., an upper edge) of the heat exchanger 204. The intermediate pipe 612 is adjacent a third edge 618 (e.g., a lower edge) of the heat exchanger 204.

The cleanout system 600 of the illustrated example includes two cleanout passageways 602 and two cleanout outlets 604. However, any number of cleanout passageways 602 and cleanout outlets 604 (e.g., less than two, greater than two) can be used to implement the cleanout system 600 of FIG. 6. Additionally, the first cleanout passageway 602a and the second cleanout passageway 602b are fluidly coupled to the cleanout inlet 606 (e.g., a common cleanout inlet). However, in some examples, each of the first cleanout passageway 602a and the second cleanout passageway 602b has a dedicated cleanout inlet.

Although each example cleanout systems disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. In some examples, a cleanout system disclosed in accordance with the teachings of this disclosure may have a combination of the cleanout systems 202, 500, 600, the cleanout passageways 402, 502, 602, the nozzles 508, etc. disclosed herein.

In some examples, the cleanout systems 202, 500, 600 provides means for cleaning particulate from a heat exchanger 204 without removing any of the components (e.g., the air intake 208, the exhaust plenum 212, etc.) from the aircraft 100. In some examples, the cleanout systems 202, 500, 600 provides means for cleaning particulate from a first passageway of heat exchanger, the means for cleaning to direct a cleaning fluid from the second outlet 314 (i.e., the heat exchanger outlet), through the second passageway 310 (e.g., the heat exchanger passageway), and to the second inlet 312 (e.g., the heat exchanger inlet). In some examples, the cleanout inlet 404, 504, 606 provides means for receiving the cleaning fluid 420. In some examples, the cleanout outlets 406, 506, 604a, 604b, the openings 418, the nozzles 508, and/or the openings 610a, 610b provide means for dispensing the cleaning fluid 420 toward the second side 210 of the heat exchanger 204. In some examples, the cleanout passageways 402, 502, 602 and/or the pipes 412, 608a, 608b, 612 provide means for channeling a cleaning fluid 420 (e.g., toward to the cleanout outlet 406, 506, 604). In some examples, the air intake 208 provides means for receiving a cooling fluid (e.g., ram air). In some examples, the heat exchanger 204 provides means for transferring heat between a cooling fluid and a process fluid. In some examples, the exhaust plenum 212 provides means for exhausting the cooling fluid from the second outlet 314 of the heat exchanger 204.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

From the foregoing, it will be appreciated that example methods, apparatus and articles of manufacture improve maintenance operations for any platform, vehicle or system that draws or receives an operating fluid (e.g., air) in harsh conditions. At least some of the aforementioned examples include one or more features and/or benefits including, but not limited to, the following:

Example 1 includes an environmental control system (ECS) includes an exhaust plenum to exhaust cooling fluid from a heat exchanger outlet of a heat exchanger, and a cleanout system coupled to the exhaust plenum adjacent the heat exchanger outlet. The cleanout system includes a cleanout passageway to fluidly couple a cleanout inlet accessible from an outer surface of the exhaust plenum and a cleanout outlet in fluid communication with the heat exchanger outlet. The cleanout system is to enable removal of particulate from the heat exchanger without disassembling the heat exchanger from the exhaust plenum or an air intake.

Example 2 includes the cleanout system of Example 1, where the cleanout passageway is fixed to the exhaust plenum during operation of the ECS.

Example 3 includes the cleanout system of any one of Examples 1-2, where the cleanout passageway extends across at least a portion of the heat exchanger outlet.

Example 4 includes the cleanout system of any one of Examples 1-3, where the cleanout outlet includes a plurality of openings oriented toward the heat exchanger outlet, the openings to direct cleaning fluid toward the heat exchanger outlet.

Example 5 includes the cleanout system of any one of Examples 1-4, where the cleanout outlet includes a plurality of nozzles oriented toward the heat exchanger outlet.

Example 6 includes the cleanout system of any one of Examples 1-5, where the cleanout passageway includes a first cleanout passageway and a second cleanout passageway spaced from the first cleanout passageway.

Example 7 includes the cleanout system of any one of Examples 1-6, further including an intermediate passageway to fluidly couple the second cleanout passageway and cleanout inlet.

Example 8 includes the cleanout system of any one of Examples 1-7, where the cleanout inlet protrudes from an outer surface of the exhaust plenum.

Example 9 includes the cleanout system of any one of Examples 1-8, where the cleanout passageway is to direct cleaning fluid from the cleanout inlet to the cleanout outlet, and the cleanout outlet is to direct the cleaning fluid from a heat exchanger outlet, through a heat exchanger passageway, and to a heat exchanger inlet.

Example 10 includes the cleanout system of any one of Examples 1-9, where at least a portion of the cleanout passageway is located in a cavity of the exhaust plenum.

Example 11 includes the cleanout system of any one of Examples 1-10, where the exhaust plenum includes a first plenum duct and a second plenum duct, the cleanout passageway positioned between the first plenum duct and the second plenum duct.

Example 12 includes an environmental control system (ECS) including: an air intake; a heat exchanger; and an exhaust plenum. The heat exchanger is positioned between the air intake and the exhaust plenum. The heat exchanger has a heat exchanger inlet in fluid communication with the air intake and a heat exchanger outlet in fluid communication with the exhaust plenum. A cleanout system is carried by the exhaust plenum and positioned adjacent the heat exchanger outlet. The cleanout system has a cleanout passageway between a cleanout inlet and a cleanout outlet.

Example 13 includes the cleanout system of Example 12, where the cleanout inlet is accessible from an outer surface of the exhaust plenum.

Example 14 includes the cleanout system of any one of Examples 12-13, where the cleanout passageway is located in a cavity defined by the exhaust plenum.

Example 15 includes the cleanout system of any one of Examples 12-14 where the cleanout passageway includes at least one pipe positioned in the cavity of the exhaust plenum, the pipe including at least one of an opening or a nozzle located along a length of the pipe to define the cleanout outlet.

Example 16 includes the cleanout system of any one of Examples 12-15, where the air intake is directly attached to a first side of the heat exchanger defining the heat exchanger inlet and the exhaust plenum is directly attached to a second side heat exchanger defining the heat exchanger outlet.

Example 17 includes the cleanout system of any one of Examples 12-16, where the cleanout system removes particulate from a heat exchanger passageway located between the heat exchanger inlet and the heat exchanger outlet while the air intake and the exhaust plenum are attached to the heat exchanger.

Example 18 includes an environmental control system including means for receiving a cooling fluid and means for transferring heat between the cooling fluid and a process fluid. The means for transferring heat having a first passageway between a first inlet and a first outlet. The first inlet to receive the cooling fluid from the means for receiving. The ECS includes means for exhausting to exhaust the cooling fluid from the first outlet of the means for transferring heat and means for cleaning particulate from first passageway of the means for transferring heat. The means for cleaning to direct a cleaning fluid from the first outlet, through the first passageway, and to the first inlet.

Example 19 includes the system of Example 18, where the means for cleaning includes a means for channeling a cleaning fluid between a means for receiving the cleaning fluid and a means for dispensing the cleaning fluid toward the means for transferring heat, the means for receiving the cleaning fluid being accessible from an outer surface of the means for exhausting.

Example 20 includes the system of any one of Examples 18-20, where the means for channeling the cleaning fluid is carried by the means for exhausting.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An environmental control system (ECS) for an aircraft, the system comprising:
   an exhaust plenum to exhaust cooling fluid from a heat exchanger outlet of a heat exchanger; and a cleanout system coupled to the exhaust plenum adjacent the heat exchanger outlet, the cleanout system including a cleanout passageway to fluidly couple a cleanout inlet accessible from an outer surface of the exhaust plenum and a cleanout outlet in fluid communication with the heat exchanger outlet, the cleanout system to enable removal of particulate from the heat exchanger without disassembling the heat exchanger from the exhaust plenum or an air intake from the heat exchanger, wherein the cleanout outlet includes a plurality of openings oriented toward the heat exchanger outlet, the openings to direct cleaning fluid toward the heat exchanger outlet.

2. The system of claim 1, wherein the cleanout passageway is fixed to the exhaust plenum and remains attached to the exhaust plenum during operation of the ECS.

3. The system of claim 1, wherein the cleanout passageway extends across at least a portion of the heat exchanger outlet.

4. The system of claim 1, wherein the cleanout inlet protrudes from the outer surface of the exhaust plenum.

5. The system of claim 1, wherein the cleanout passageway is to direct cleaning fluid from the cleanout inlet to the cleanout outlet, and the cleanout outlet is to direct the cleaning fluid from the heat exchanger outlet, through a heat exchanger passageway, and to a heat exchanger inlet.

6. The system of claim 1, wherein at least a portion of the cleanout passageway is located in a cavity of the exhaust plenum.

7. An environmental control system (ECS) for an aircraft, the system comprising:
an exhaust plenum to exhaust cooling fluid from a heat exchanger outlet of a heat exchanger; and
a cleanout system coupled to the exhaust plenum adjacent the heat exchanger outlet, the cleanout system including a cleanout passageway to fluidly couple a cleanout inlet accessible from an outer surface of the exhaust plenum and a cleanout outlet in fluid communication with the heat exchanger outlet, the cleanout system to enable removal of particulate from the heat exchanger without disassembling the heat exchanger from the exhaust plenum or an air intake from the heat exchanger, wherein the cleanout outlet includes a plurality of nozzles oriented toward the heat exchanger outlet.

8. An environmental control system (ECS) for an aircraft, the system comprising:
an exhaust plenum to exhaust cooling fluid from a heat exchanger outlet of a heat exchanger; and
a cleanout system coupled to the exhaust plenum adjacent the heat exchanger outlet, the cleanout system including a cleanout passageway to fluidly couple a cleanout inlet accessible from an outer surface of the exhaust plenum and a cleanout outlet in fluid communication with the heat exchanger outlet, the cleanout system to enable removal of particulate from the heat exchanger without disassembling the heat exchanger from the exhaust plenum or an air intake from the heat exchanger, wherein the cleanout passageway includes a first cleanout passageway and a second cleanout passageway spaced from the first cleanout passageway.

9. The system of claim 8, wherein the cleanout outlet includes a plurality of openings oriented toward the heat exchanger outlet, the openings to direct cleaning fluid toward the heat exchanger outlet.

10. The system of claim 8, further including an intermediate passageway to fluidly couple the second cleanout passageway and the cleanout inlet.

11. An environmental control system (ECS) for an aircraft, the system comprising:
an exhaust plenum to exhaust cooling fluid from a heat exchanger outlet of a heat exchanger, wherein the exhaust plenum includes a first plenum duct and a second plenum duct; and
a cleanout system coupled to the exhaust plenum adjacent the heat exchanger outlet, the cleanout system including a cleanout passageway to fluidly couple a cleanout inlet accessible from an outer surface of the exhaust plenum and a cleanout outlet in fluid communication with the heat exchanger outlet, the cleanout system to enable removal of particulate from the heat exchanger without disassembling the heat exchanger from the exhaust plenum or an air intake from the heat exchanger, the cleanout passageway positioned between the first plenum duct and the second plenum duct.

12. An environmental control system (ECS) for an aircraft, the system comprising:
an air intake;
a heat exchanger;
an exhaust plenum, the heat exchanger being positioned between the air intake and the exhaust plenum, the heat exchanger having a heat exchanger inlet in fluid communication with the air intake and a heat exchanger outlet in fluid communication with the exhaust plenum; and
a cleanout system carried by the exhaust plenum and positioned adjacent the heat exchanger outlet, the cleanout system having a cleanout passageway between a cleanout inlet and a cleanout outlet, wherein the cleanout passageway is located in a cavity defined by the exhaust plenum, and wherein the cleanout passageway includes at least one pipe positioned in the cavity of the exhaust plenum, the pipe including at least one of an opening or a nozzle located along a length of the pipe to define the cleanout outlet.

13. The system of claim 12, wherein the cleanout inlet is accessible from an outer surface of the exhaust plenum.

14. An environmental control system (ECS) for an aircraft, the system comprising:
an air intake;
a heat exchanger;
an exhaust plenum, the heat exchanger being positioned between the air intake and the exhaust plenum, the heat exchanger having a heat exchanger inlet in fluid communication with the air intake and a heat exchanger outlet in fluid communication with the exhaust plenum; and
a cleanout system carried by the exhaust plenum and positioned adjacent the heat exchanger outlet, the cleanout system having a cleanout passageway between a cleanout inlet and a cleanout outlet, wherein the air intake is directly attached to a first side of the heat exchanger defining the heat exchanger inlet and the exhaust plenum is directly attached to a second side of the heat exchanger defining the heat exchanger outlet.

15. The system of claim 14, wherein the cleanout passageway is located in a cavity defined by the exhaust plenum.

16. The system of claim 15, wherein the cleanout passageway includes at least one pipe positioned in the cavity of the exhaust plenum, the pipe including at least one of an opening or a nozzle located along a length of the pipe to define the cleanout outlet.

17. The system of claim 14, wherein the cleanout system removes particulate from a heat exchanger passageway located between the heat exchanger inlet and the heat exchanger outlet when the air intake and the exhaust plenum are attached to the heat exchanger.

18. An environmental control system for aircraft, the system comprising:
- means for receiving a cooling fluid;
- means for transferring heat between the cooling fluid and a process fluid, the means for transferring heat having a first passageway between a first inlet and a first outlet, the first inlet to receive the cooling fluid from the means for receiving;
- means for exhausting to exhaust the cooling fluid from the first outlet of the means for transferring heat; and
- means for cleaning particulate from the first passageway of the means for transferring heat, the means for cleaning having means for dispensing including at least one of a plurality of openings or a plurality of nozzles being oriented toward the first outlet of the means for transferring heat to direct a cleaning fluid from the first outlet, through the first passageway, and to the first inlet.

19. The system of claim 18, wherein the means for cleaning includes a means for channeling a cleaning fluid between a means for receiving the cleaning fluid and the means for dispensing the cleaning fluid toward the means for transferring heat, the means for receiving the cleaning fluid being accessible from an outer surface of the means for exhausting.

20. The system of claim 19, wherein the means for channeling the cleaning fluid is carried by the means for exhausting.

* * * * *